United States Patent
Ramappan et al.

(10) Patent No.: US 9,506,420 B2
(45) Date of Patent: Nov. 29, 2016

(54) EXTERNAL EGR RATE FEEDBACK

(71) Applicant: GM GLOBAL TECHNOLOGY OPERATIONS LLC, Detroit, MI (US)

(72) Inventors: Vijay Ramappan, Novi, MI (US); Darrell W. Burleigh, Wixom, MI (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 13/756,869

(22) Filed: Feb. 1, 2013

(65) Prior Publication Data

US 2014/0222318 A1 Aug. 7, 2014

(51) Int. Cl.
- F02D 41/00 (2006.01)
- F02D 43/04 (2006.01)
- F02D 41/14 (2006.01)
- F02D 41/30 (2006.01)
- F02D 37/02 (2006.01)

(52) U.S. Cl.
CPC ........... *F02D 43/04* (2013.01); *F02D 41/0072* (2013.01); *F02D 41/0077* (2013.01); *F02D 37/02* (2013.01); *F02D 41/0002* (2013.01); *F02D 41/1446* (2013.01); *F02D 41/1454* (2013.01); *F02D 41/30* (2013.01); *F02D 2200/0418* (2013.01); *F02D 2200/0611* (2013.01); *Y02T 10/47* (2013.01)

(58) Field of Classification Search
CPC ............... F02D 2200/0418; F02D 2041/1472; F02D 41/0072; F02D 41/0075; F02D 41/0065; F02D 41/0047
USPC ........................................................ 701/108
See application file for complete search history.

(56) References Cited

U.S. PATENT DOCUMENTS

| | | | | |
|---|---|---|---|---|
| 2,075,388 A | * | 3/1937 | De Cloud | F02B 77/02 123/669 |
| 6,058,904 A | * | 5/2000 | Kruse | F02B 41/00 123/295 |
| 6,148,616 A | * | 11/2000 | Yoshida | F02B 37/24 60/605.2 |
| 6,230,503 B1 | * | 5/2001 | Spletzer | B01D 53/26 62/271 |
| 6,725,665 B2 | * | 4/2004 | Tuschy | F02C 6/16 60/39.21 |
| 7,292,929 B2 | * | 11/2007 | Durand | F02D 41/005 123/568.21 |
| 7,715,976 B1 | * | 5/2010 | Xiao | F02M 25/0755 123/406.48 |
| 8,121,774 B2 | | 2/2012 | Kesse et al. | |
| 2007/0239344 A1 | | 10/2007 | Durand | |
| 2008/0167790 A1 | | 7/2008 | Kotooka et al. | |

(Continued)

FOREIGN PATENT DOCUMENTS

| | | |
|---|---|---|
| CN | 101046179 A | 10/2007 |
| CN | 101065564 A | 10/2007 |

(Continued)

*Primary Examiner* — Hung Q Nguyen
*Assistant Examiner* — Josh Campbell

(57) ABSTRACT

An engine control system for a vehicle includes an exhaust gas recirculation (EGR) rate-estimation module and a control module. The EGR rate-estimation module receives a first signal indicating a first relative humidity of a flow of air and a second signal indicating a second relative humidity of a mixed flow of air and exhaust gas. The EGR rate-estimation module determines an estimated EGR rate based on the first relative humidity and the second relative humidity, wherein the estimated EGR rate corresponds to a flow rate of a flow of exhaust gas to an engine. The control module selectively adjusts an engine operating parameter based on the estimated EGR rate.

12 Claims, 3 Drawing Sheets

(56) References Cited

U.S. PATENT DOCUMENTS

2010/0199959 A1\* 8/2010 Brown et al. .................. 123/672
2010/0319444 A1\* 12/2010 Miyaura ............... F02D 35/026
　　　　　　　　　　　　　　　　　　　　73/114.49

FOREIGN PATENT DOCUMENTS

| CN | 201902257 U | 7/2011 |
|---|---|---|
| CN | 102308079 A | 1/2012 |
| DE | 10018308 B4 \* | 10/2006 |

\* cited by examiner

EXTERNAL EGR RATE FEEDBACK

FIELD

The present disclosure relates to internal combustion engines and, more specifically, to exhaust gas recirculation control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts air and fuel to generate torque. Air flows into the engine through an intake system. The intake system may include a throttle valve and an intake manifold. Fuel is provided by one or more fuel injectors. The engine outputs torque to a transmission. The transmission transfers torque to one or more wheels. Exhaust gas resulting from combustion is expelled from the engine to an exhaust system.

The engine recirculates the exhaust gas back to the intake system. For the exhaust gas to flow back to the intake system, pressure within the exhaust system must be greater than a pressure of the intake system at a location corresponding to the inlet of the exhaust gas. The exhaust gas recirculation (EGR) may be controlled such that a target mixture of exhaust gas, air, and fuel is provided to each cylinder. The engine may not operate as intended if the target mixture is not maintained.

SUMMARY

An engine control system for a vehicle includes an exhaust gas recirculation (EGR) rate-estimation module and a control module. The EGR rate-estimation module receives a first signal indicating a first relative humidity of a flow of air and a second signal indicating a second relative humidity of a mixed flow of air and exhaust gas. The EGR rate-estimation module determines an estimated EGR rate based on the first relative humidity and the second relative humidity, wherein the estimated EGR rate corresponds to a flow rate of a flow of exhaust gas to an engine. The control module selectively adjusts an engine operating parameter based on the estimated EGR rate.

An engine control method for a vehicle includes: receiving a first signal indicating a first relative humidity of a flow of air, receiving a second signal indicating a second relative humidity of a mixed flow of air and exhaust gas, and determining an estimated EGR rate. The estimated EGR rate corresponds to a flow rate of a flow of exhaust gas to an engine. The engine control method further includes: selectively adjusting an engine operating parameter based on the estimated EGR rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts air and fuel within cylinders to produce drive torque for a vehicle. The engine outputs exhaust gas resulting from combustion to an exhaust system. The engine recirculates exhaust gas from the exhaust system back to an intake system.

A gas charge is drawn into a cylinder of the engine for each combustion event of the engine. The gas charge may include air drawn through a throttle valve and exhaust gas recirculated to the intake system. An exhaust gas recirculation (EGR) rate-control system according to the principles of the present disclosure estimates a flow rate of the exhaust gas recirculated to the intake system based on an estimated specific humidity of an EGR flow and respective humidities of air entering the intake manifold and a mixed flow of air and exhaust gas in the intake manifold. The humidity of the air entering the intake manifold may be measured or estimated.

Figure 1:
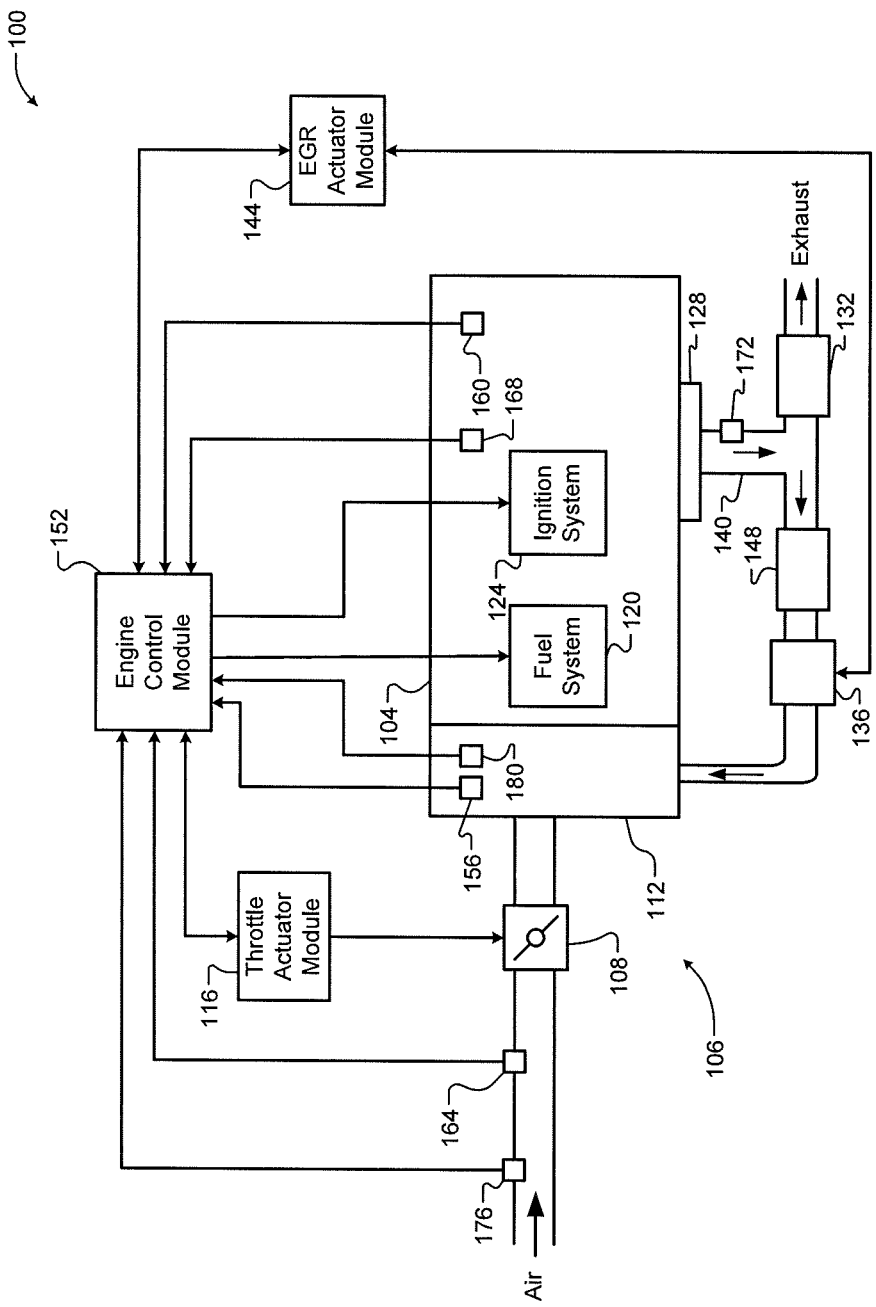
FIG. 1 is a functional block diagram of an example engine system according to the present disclosure.

Referring now to FIG. 1, a functional block diagram of an example engine system 100 is presented. While the engine system 100 will be discussed in terms of a spark ignition engine system, the present disclosure is also applicable to other types of engine systems including compression ignition engine systems and hybrid engine systems.

Air is drawn into an engine 104 through an intake system 106. The intake system 106 may include a throttle valve 108 and an intake manifold 112. Air may flow into the engine 104 through the throttle valve 108 and the intake manifold 112. The throttle valve 108 regulates airflow into the intake manifold 112. A throttle actuator module 116 controls actuation of the throttle valve 108. The engine 104 combusts an air/fuel mixture within cylinders of the engine 104. A fuel system 120 selectively injects fuel into the engine 104. An ignition system 124 selectively provides spark to the engine 104 for combustion.

Combustion of the air/fuel mixture drives a crankshaft and produces exhaust gas. The engine 104 outputs the exhaust gas to an exhaust manifold 128. A catalyst 132 receives the exhaust gas from the exhaust manifold 128 and reacts with various components of the exhaust gas. For example only, the catalyst 132 may include a three-way catalyst (TWC), a catalytic converter, or another suitable type of catalyst.

The engine system 100 selectively recirculates a portion of the exhaust gas back to the intake system 106. While recirculation of the exhaust gas back to the intake manifold 112 is shown and will be discussed, the exhaust gas can be recirculated back to other places in the intake system 106. The engine system 100 includes an EGR valve 136 and an EGR conduit 140. Operation of the engine 104 creates a vacuum (low pressure relative to ambient pressure) within the intake manifold 112. Opening the EGR valve 136 allows the exhaust gas to be recirculated back to the intake manifold 112. An EGR actuator module 144 may control actuation of the EGR valve 136.

The engine system 100 may also include an EGR cooler 148 that cools the exhaust gas as the exhaust gas flows through the EGR cooler 148 on its way back to the intake manifold 112. In various implementations, the engine system 100 may further include a cooler bypass system that can be controlled to allow the exhaust gas to bypass the EGR cooler 148 on its way back to the intake manifold 112. The exhaust gas may be recirculated back to the intake manifold 112 from upstream of the catalyst 132 as shown in FIG. 1, but it is also understood that the exhaust gas may alternatively be recirculated back to the intake manifold 112 from downstream of the catalyst 132.

An engine control module (ECM) 152 regulates operation of the engine system 100 according to the present disclosure. For example, the ECM 152 may control opening of the throttle valve 108 via the throttle actuator module 116, opening of the EGR valve 136 via the EGR actuator module 144, fuel injection amount and timing via the fuel system 120, and spark timing via the ignition system 124. The ECM 152 may also control the operation of the intake and exhaust valve actuators, boost devices, and/or one or more other suitable engine actuators.

The ECM 152 communicates with various sensors, such as a manifold absolute pressure (MAP) sensor 156, an engine speed sensor 160, a mass air flow (MAF) sensor 164, an engine coolant temperature sensor 168, an exhaust temperature sensor 172, an air humidity sensor 176, a manifold humidity sensor 180, and/or one or more other suitable sensors. The MAP sensor 156 generates a MAP signal indicating an absolute pressure in the intake manifold 112. The engine speed sensor 160 generates a signal based on rotation of the crankshaft. An engine speed, in revolutions per minute (RPM), can be generated based on the rotation of the crankshaft.

The MAF sensor 164 generates a MAF signal indicating a mass flow rate of air entering the intake manifold 112. The MAF sensor 164 may also generate a barometric pressure signal indicating the barometric pressure of air entering the intake manifold 112. Alternatively, a separate pressure sensor (not shown) that is not housed with the MAF sensor 164 may generate a barometric pressure signal indicating the barometric pressure of air entering the intake manifold 112. The engine coolant temperature sensor 168 generates a coolant temperature signal indicating an engine coolant temperature. The exhaust temperature sensor 172 generates an exhaust temperature signal indicating the exhaust temperature prior to the exhaust gas flowing through the EGR cooler 148 and/or other treatment devices. The air humidity sensor 176 generates an air humidity signal indicating relative humidity of the air drawn into the engine through the intake system 106. Relative humidity is the amount of water vapor in a mixture of air and water vapor, defined as the ratio of the partial pressure of water vapor in the air-water mixture to the saturated vapor pressure of water at the prescribed temperature. The air humidity sensor 176 may be integrated with the MAF sensor 164. The manifold humidity sensor 180 generates an EGR humidity signal indicating relative humidity of a mixed flow of air and exhaust gas in the intake manifold 112 and a temperature signal indicating a temperature of the mixed flow. The manifold humidity sensor 180 may be integrated with the MAP sensor 156.

Air humidity sensor 176 and manifold humidity sensor 180 may be inductive humidity sensors, which measure capacitance (C) at the relative humidity (RH) according to the following relationship:

$$C(RH) = \frac{\varepsilon_{RH} \cdot \varepsilon_O \cdot A}{d},$$

where $\varepsilon_{RH}$ is the relative dielectric permittivity, which depends on the humidity, $\varepsilon_0$ is the permittivity of free space constant, A is the cross-sectional area of the electrodes, and d is the distance between the electrodes. For example, $\varepsilon_{RH}$ is 3 at 0% relative humidity and 3.9 at 100% relative humidity.

The ECM 152 determines an engine load. For example only, the ECM 152 may determine the engine load based on an engine output torque and/or a fueling rate of the engine 104.

Figure 2:
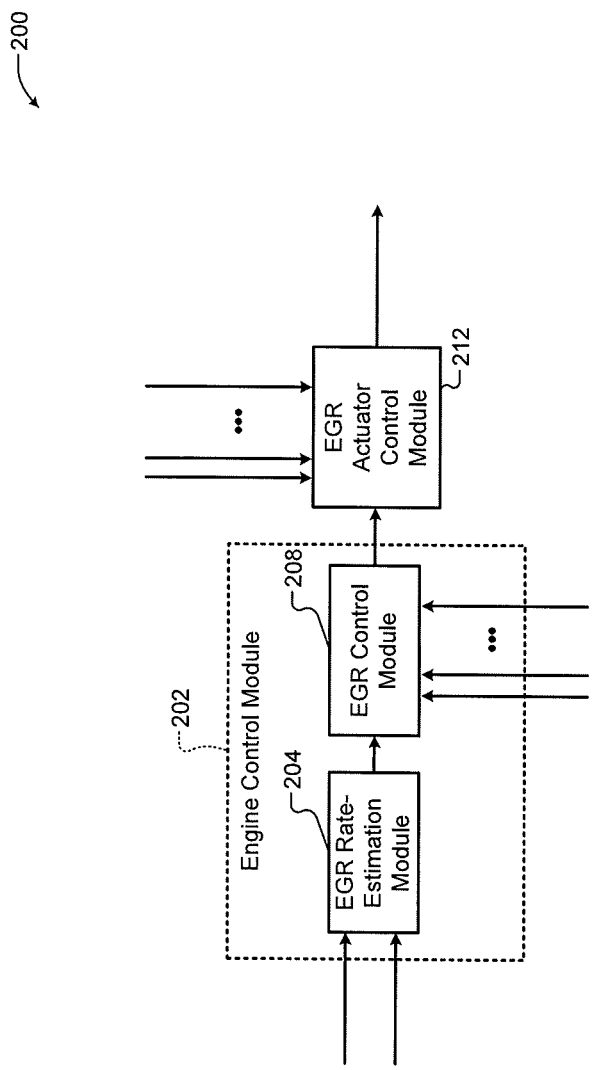
FIG. 2 is a functional block diagram of an example exhaust gas recirculation (EGR) rate-control system, including an example EGR rate-estimation module, according to the present disclosure.

Referring now to FIG. 2, a functional block diagram of an example implementation of an EGR rate-control system 200 is presented. The EGR rate-control system 200 includes an ECM 202 in communication with an EGR actuator control module 212. The ECM 202 may include an EGR rate-estimation module 204 which may determine an estimated EGR rate, and an EGR control module 208. One or more engine actuators may additionally or alternatively be controlled based on the estimated EGR rate. For example, an EGR control module 208 may determine a desired position of the EGR valve 136 based on the estimated EGR rate. The EGR control module 208 may control the EGR actuator control module 212 to control (e.g., open and close) the EGR valve 136 based on the desired position of the EGR valve 136. One or more other engine actuators may additionally or alternatively be actuated based on the estimated EGR rate.

In one embodiment, the EGR rate-estimation module 204 receives a relative humidity signal from the air humidity sensor 176 and a relative humidity signal from the manifold humidity sensor 180. Alternatively, the relative humidity of the air flow entering the intake manifold 112 may be estimated. The EGR rate-estimation module 204 may estimate a relative humidity signal of the exhaust gas entering the intake manifold based on an equivalence ratio, a fuel type, and a combustion efficiency.

The EGR rate-estimation module 204 determines an estimated EGR rate based on the relative humidity signals it receives. The EGR rate-estimation module 204 may convert the relative humidity of the air flow entering the intake manifold 112 to a specific humidity for the air flow entering the intake manifold 112 ($SH_{ind}$) based on a temperature of the mixed flow obtained from the air humidity sensor 176 and a barometric pressure obtained from the MAF sensor 164. Alternatively, the barometric pressure may be estimated or measured by a pressure sensor that may not be housed with the MAF sensor 164.

Specific humidity is the ratio of the mass of water vapor to the mass of dry air in a particular mass. The EGR rate-estimation module 204 converts the relative humidity of the mixed flow of air and exhaust gas in the intake manifold 112 to a specific humidity ($SH_{man}$) based on the temperature of the mixed flow obtained from the manifold humidity sensor 180 and the manifold pressure obtained from the MAP sensor 156. The specific humidity of the mixed flow, $SH_{man}$, corresponds to a ratio of the mass of water vapor to the mass of dry gas in the mixed flow.

The EGR rate-estimation module 204 may estimate the specific humidity of the exhaust gas ($SH_{EGR}$) entering the engine 104 (EGR flow). The water vapor content of the exhaust gas is predominantly a function of equivalence ratio (EQR), fuel type, and combustion efficiency. For stoichiometric conditions where the ratio of hydrogen to carbon is 1.87, at 100% combustion efficiency, and assuming no condensation, the ratio of water vapor to dry constituent (i.e., $SH_{EGR}$) is 0.085. Thus, $$\dot{m}_{egr,total} = (1+SH_{EGR})\dot{m}_{egr,dry} = (1+0.085)\dot{m}_{egr,dry},$$

where $\dot{m}_{egr,total}$ is the total mass flow rate of the EGR flow, and $\dot{m}_{egr,dry}$ is the mass flow rate of dry constituent in the EGR flow. An estimate of the EGR mass flow rate as a function of the specific humidities and the air mass flow rate can be developed as follows.

Applying the continuity equation to the intake manifold yields the following:

$$V_{man}\frac{d\rho_{man}}{dt} + \dot{m}_{ind,total} + \dot{m}_{EGR,total} - \dot{m}_{cyl,total} = 0$$

where
$V_{man}$ is the volume of the manifold
$\rho_{man}$ is the density of the gas in the manifold, and
$\dot{m}_{ind,total}$, $\dot{m}_{EGR,total}$, and $\dot{m}_{cyl,total}$ are the mass flow rates into the manifold from the induction system, from the EGR system, and out of the manifold to the cylinders, respectively.

Applying the ideal gas law to the gas in the intake manifold yields the following expression for the derivative of the density with respect to time:

$$\frac{d\rho_{man}}{dt} = \frac{\partial \rho_{man}}{\partial P}\dot{P} + \frac{\partial \rho_{man}}{\partial T}\dot{T} + \frac{\partial \rho_{man}}{\partial R}\dot{R} + \frac{\partial \rho_{man}}{\partial V_{man}}\dot{V}_{man}$$

where
$\rho_{man}$ is the density of the gas in the manifold
t is time
P is the absolute pressure in the intake manifold
T is the average absolute temperature in the intake manifold, and
R is the gas specific constant for the gas in the intake manifold.

Combining these equations and noting that the manifold volume typically does not change with time yields the following:

$$V_{man}\left(\frac{\partial \rho_{man}}{\partial P}\dot{P} + \frac{\partial \rho_{man}}{\partial T}\dot{T} + \frac{\partial \rho_{man}}{\partial R}\dot{R}\right) + \dot{m}_{ind,total} + \dot{m}_{EGR,total} - \dot{m}_{cyl,total}$$

This equation is valid for the transient case without condensation effects. The condensation effects may be modeled and represented in lookup tables. The equation may also be extended as necessary to accommodate additional flow streams such as a purge flow. Factors such as mass transport and a lag in sensor response time must be accounted for if the transient solution is to be applied. While this discussion will be limited to the steady state, steady flow case where the rates of change of pressure, temperature, and gas constant terms go to zero, but it is understood that the equations may be modified to accommodate additional factors as described above. Substituting for the mass flow rates using the definition of specific humidity and solving for the EGR mass flow rate in terms of the specific humidities and the dry induction mass flow rate yields the following:

$$\dot{m}_{EGR,total} = (1 + SH_{EGR})\frac{SH_{ind} - SH_{man}}{SH_{man} - SH_{EGR}}\dot{m}_{ind,dry}$$

Additionally, the EGR rate-estimation module 204 determines the estimated EGR rate based on induction mass flow rate and EGR mass flow rate or based on the specific humidities of the flow streams, according to:

$$EGR_{rate} = \frac{\dot{m}_{egr,total}}{\dot{m}_{ind,total} + \dot{m}_{egr,total}} = \frac{(1 + SH_{EGR})(SH_{ind} - SH_{man})}{(1 + SH_{ind})(SH_{man} - SH_{EGR}) + (1 + SH_{EGR})(SH_{ind} - SH_{man})}$$

Additionally or alternatively, one or more other parameters, such as fuel injection timing, fuel injection amount, and spark timing, may selectively be adjusted based on the estimated EGR rate.

Figure 3:
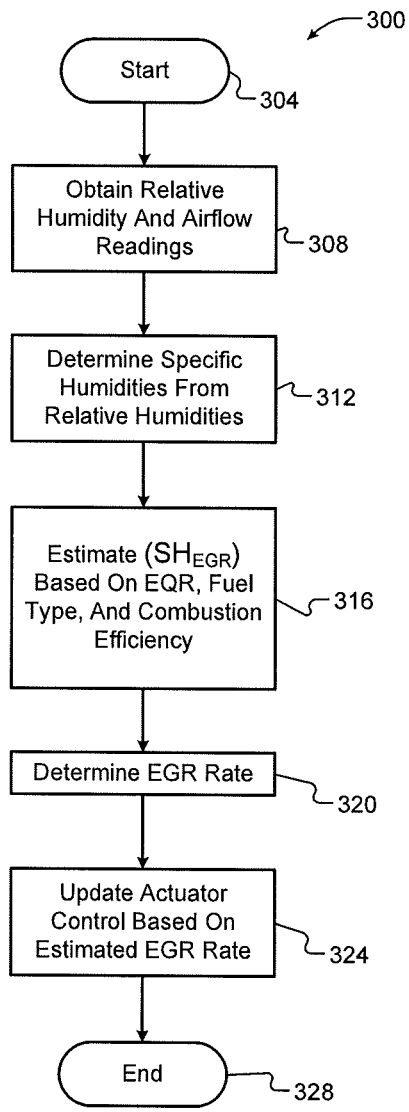
FIG. 3 illustrates a method of determining an estimated EGR rate according to the present disclosure.

Referring now to FIG. 3, an example method 300 of determining the estimated EGR rate begins at 304. At 308, the method 300 determines the relative humidity of the air flow entering the intake manifold 112, the relative humidity of the mixed flow of air and exhaust gas in the intake manifold 112, and air flow readings from the various sensors. At 312, the method 300 converts the relative humidities of the air entering the intake manifold 112 and the mixed flow in the intake manifold 112 to specific humidities. At 316, the method 300 estimates the specific humidity in the EGR flow ($SH_{EGR}$) based on EQR, fuel type, and combustion efficiency. At 320, the method 300 determines the estimated EGR rate, for example, using the equation:

$$EGR_{rate} = \frac{\dot{m}_{egr,total}}{\dot{m}_{ind,total} + \dot{m}_{egr,total}} = \frac{(1 + SH_{EGR})(SH_{ind} - SH_{man})}{(1 + SH_{ind})(SH_{man} - SH_{EGR}) + (1 + SH_{EGR})(SH_{ind} - SH_{man})}$$

At 324, the method 300 updates the EGR control module 208 based on the estimated EGR rate, which may control the position of EGR valve 136 via the EGR actuator control module 212.

The method 300 may selectively adjust one or more other engine operating parameters based on the estimated EGR rate. For example, control may selectively adjust opening of the throttle valve 108 based on the estimated EGR rate. Control may additionally or alternatively adjust one or more other engine airflow actuators, such as one or more boost devices, one or more valve actuators, etc., based on the estimated EGR rate. Additionally or alternatively, control may selectively adjust spark timing and/or fueling amount and/or timing based on the estimated EGR rate. While control is shown as ending after 324 at 328, FIG. 3 may be illustrative of one control loop. Control may return to 308 and execute one control loop every predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system for a vehicle, comprising: an exhaust gas recirculation (EGR) rate-estimation module that receives a first signal indicating a first relative humidity of a flow of air, that receives a second signal indicating a second relative humidity of a mixed flow of air and exhaust gas, and that determines an estimated EGR rate based on the first relative humidity and the second relative humidity, wherein the estimated EGR rate corresponds to a flow rate of a flow of exhaust gas to an engine; and a control module that selectively adjusts an engine operating parameter based on the estimated EGR rate, wherein the EGR rate-estimation module converts the first relative humidity of the flow of air to a specific humidity of the flow of air, converts the second relative humidity of the mixed flow of air and exhaust gas to a specific humidity of the mixed flow of air and exhaust gas, estimates, based on a fuel type, an equivalence ratio (EQR), and a combustion efficiency, a specific humidity of the flow of exhaust gas to the engine, and determines the estimated EGR rate based on the specific humidity of the flow of air, the specific humidity of the mixed flow of air and exhaust gas, and the specific humidity of the flow of exhaust gas to the engine, wherein, to determine the estimated EGR rate, the EGR rate-estimation module calculates the estimated EGR rate according to $$EGR_{rate} = \frac{(1 + SH_{EGR})(SH_{ind} - SH_{man})}{(1 + SH_{ind})(SH_{man} - SH_{EGR}) +},$$
$$(1 + SH_{EGR})(SH_{ind} - SH_{man})$$

where $EGR_{rate}$ corresponds to the estimated EGR rate, where $SH_{EGR}$ corresponds to the estimated specific humidity of the flow of exhaust gas to the engine, $SH_{ind}$ corresponds to the specific humidity of the flow of air, and $SH_{man}$ corresponds to the specific humidity of the mixed flow of air and exhaust gas.

2. The engine control system of claim 1, further comprising:
a first humidity sensor, located in an air intake system of the engine, that generates the first signal; and
a second humidity sensor, located in an intake manifold of the engine, that generates the second signal.

3. The engine control system of claim 1, wherein the EGR-rate estimation module determines the estimated EGR rate further based on a mass fraction of vapor of the flow of exhaust gas to the engine.

4. The engine control system of claim 1, wherein the control module selectively adjusts opening of an EGR valve based on the estimated EGR rate.

5. The engine control system of claim 1, wherein the control module selectively adjusts at least one of spark timing and fueling based on the estimated EGR rate.

6. The engine control system of claim 1, wherein the control module selectively adjusts opening of a throttle valve based on the estimated EGR rate.

7. An engine control method for a vehicle, comprising: receiving a first signal indicating a first relative humidity of a flow of air; receiving a second signal indicating a second relative humidity of a mixed flow of air and exhaust gas; determining an estimated EGR rate, wherein the estimated EGR rate corresponds to a flow rate of a flow of exhaust gas to an engine; and selectively adjusting an engine operating parameter based on the estimated EGR rate, wherein determining the estimated EGR rate includes converting the first relative humidity of the flow of air to a first specific humidity of the flow of air, converting the second relative humidity of the mixed flow of air and exhaust gas to a second specific humidity of the mixed flow of air and exhaust gas, estimating, based on a fuel type, an equivalence ratio (EQR), and a combustion efficiency, a specific humidity of the flow of exhaust gas to the engine, and determining the estimated EGR rate based on the specific humidity of the flow of air, the specific humidity of the mixed flow of air and exhaust gas, and the specific humidity of the flow of exhaust gas to the engine, wherein determining the estimated EGR rate includes determining the estimated EGR rate according to $$EGR_{rate} = \frac{(1 + SH_{EGR})(SH_{ind} - SH_{man})}{(1 + SH_{ind})(SH_{man} - SH_{EGR}) +},$$
$$(1 + SH_{EGR})(SH_{ind} - SH_{man})$$

where EGRrate corresponds to the estimated EGR rate, where SHEGR corresponds to the estimated specific humidity of the flow of exhaust gas to the engine, SHind corresponds to the specific humidity of the flow of air, and SHman corresponds to the specific humidity of the mixed flow of air and exhaust gas.

8. The engine control method of claim 7 further comprising:
sensing the first relative humidity of the flow of air located in an air intake system of the engine; and
sensing the second relative humidity of the mixed flow of air and exhaust gas located in an intake manifold of the engine.

9. The engine control method of claim 7, further comprising determining the estimated EGR rate further based on a mass fraction of vapor of the flow of exhaust gas to the engine.

10. The engine control method of claim 7 further comprising selectively adjusting opening of an EGR valve based on the estimated EGR rate.

11. The engine control method of claim 7 further comprising selectively adjusting at least one of spark timing and fueling based on the estimated EGR rate.

12. The engine control method of claim 7 further comprising selectively adjusting opening of a throttle valve based on the estimated EGR rate.

* * * * *